(12) United States Patent
Kikuchi

(10) Patent No.: US 9,519,070 B2
(45) Date of Patent: Dec. 13, 2016

(54) EARTHQUAKE PRECURSOR OBSERVATION DEVICE AND METHOD

(71) Applicant: Toshiaki Kikuchi, Yokosuka (JP)

(72) Inventor: Toshiaki Kikuchi, Yokosuka (JP)

( * ) Notice: Subject to any disclaimer, the term of this patent is extended or adjusted under 35 U.S.C. 154(b) by 840 days.

(21) Appl. No.: 13/871,510

(22) Filed: Apr. 26, 2013

(65) Prior Publication Data

US 2014/0039800 A1    Feb. 6, 2014

(30) Foreign Application Priority Data

May 9, 2012    (JP) ................. 2012-107925

(51) Int. Cl.
*G01V 1/00*    (2006.01)

(52) U.S. Cl.
CPC ........... *G01V 1/008* (2013.01); *G01V 2210/65* (2013.01); *G01V 2210/679* (2013.01)

(58) Field of Classification Search
CPC combination set(s) only.
See application file for complete search history.

(56) References Cited

FOREIGN PATENT DOCUMENTS

| EP | 2662708 | * 11/2013 | ....... G01V 2210/679 |
|----|---------|-----------|------------------------|
| JP | 2003-66152 | 3/2003 | |
| JP | 2012230016 | * 11/2012 | ............... G01V 1/00 |

OTHER PUBLICATIONS

V. Pavlov et al., "Transition scattering in stochastically inhomogeneous media", J. Acoust. Soc. Am., vol. 125, No. 2, Feb. 2009, pp. 676-689.
T. Kikuchi and K. Mizutani, "Time reversal for seismic waves in Suruga bay", Academic Publication of the Acoustical Society of Japan, 2-2-1 (2011, 9).
T. Kikuchi and K. Mizutani, "Time Reversal and Azimuth of Seismic Wave in Suruga Bay", Proc. Symp. Ultrasonic Electronics 32 (2011) 35.
W. A. Kuperman et al., "Phase conjugation in the ocean: Experimental demonstration of an acoustic time-reversal mirror", J. Acoust. Soc. Am. vol. 103, No. 1, pp. 25-40 (1998, 1).

(Continued)

*Primary Examiner* — Huan Tran
(74) *Attorney, Agent, or Firm* — Greenblum & Bernstein, P.L.C.

(57) ABSTRACT

A data acquisition module acquires seismic data actually measured at a plurality of observation points; a pulse calculation module acquires information of a propagation environment where seismic waves propagate from a hypocenter of earthquake to each observation point, and applies time reversal processing on the seismic waves received at the observation points by considering the propagation environment to acquire time reversal pulses at each observation point; a line calculation module calculates a parametric line in a length direction of a fault from a distribution of azimuths of frequency spectra of the time reversal pulses acquired by the pulse calculation module; a head searching module searches a parametric head by analyzing the seismic waves received in the vicinity of the parametric line calculated by the line calculation module; and a monitoring module monitors developments of a crack in the fault by observing the parametric head searched by the head searching module.

4 Claims, 20 Drawing Sheets

(56) References Cited

OTHER PUBLICATIONS

T. Kikuchi and K. Mizutani, "Environmental variation and time reversal in shallow water", Academic Publication of the Acoustical Society of Japan, 2-1-17 (2009. 3).
T. Kikuchi and K. Mizutani, "Presumption of propagation environment by time reversal", Academic Publication of the Marine Acoustical Society of Japan, 09-37 (2009, 5).
T. Kikuchi and K. Mizutani, "Time reversal of underwater acoustic wave and seismic wave", Academic Publication of the Acoustical Society of Japan, 3-2-13 (2010, 3).
T. Kikuchi and K. Mizutani, "Presumption of Hypocenter Vibration of Earthquake by Time Reversal", Proc. Symp. Ultrasonic Electronics vol. 31 (2010) pp. 575-576.
H. Medwin: "Sound in the Sea", Cambridge University Press, 2005, Chapter 4.

* cited by examiner

EARTHQUAKE PRECURSOR OBSERVATION DEVICE AND METHOD

CROSS-REFERENCE TO RELATED APPLICATION

This application is based upon and claims the benefit of priority from Japanese patent application No. 2012-107925, filed on May 9, 2012, the disclosure of which is incorporated herein in its entirety by reference.

BACKGROUND OF THE INVENTION

1. Field of the Invention

The present invention relates to an earthquake precursor observing device, a method thereof, and an earthquake precursor observing program for observing an earthquake precursor based on earthquake data obtained from a weak earthquake.

2. Description of the Related Technique

Currently, an earthquake precursor prediction instant alert system has already been developed for informing the estimated intensity and estimated arrival time of an earthquake and for supporting prompt preparation for the earthquake to prevent having damages of disasters (Japanese Unexamined Patent Publication 2003-66152: Patent Document 1).

The earthquake prediction instant alert system according to Patent Document 1 is an earthquake prediction instant alert system which predicts and alerts the arrival time of an seismic wave based on realtime information regarding the earthquake, which includes: a receiving module for receiving the realtime information regarding the earthquake; a first judging module for judging necessity of dispatching an alert based on the realtime information received by the receiving module; a prediction calculation module for calculating a prediction of the seismic wave arriving at a specific location based on the realtime information received by the receiving module; and an alert module which alerts the arrival of the seismic wave prediction-calculated by the prediction calculation module. The earthquake precursor observing device transmits an earthquake parameter determined by a network of seismic stations before the seismic wave arrives at the location, and instantly calculates and displays necessary information for that location by considering the position of that location and the seismologic characteristic.

The earthquake prediction instant alert system according to Patent Document 1 may be useful for informing the estimated intensity and estimated arrival time of an earthquake and for supporting prompt preparation for the earthquake to prevent having damages of disasters. However, the system alerts the estimated intensity and the estimated arrival time of an earthquake based on the realtime information regarding the earthquake, so that it is necessary to prepare for the occurrence of an earthquake in units of several minutes.

It is therefore an exemplary object of the present invention to provide an earthquake precursor observing device, a method thereof, and an earthquake precursor observing program for observing a precursor of an earthquake by finding an active fault which induces an earthquake based on seismic waves received at observation points.

In order to achieve the foregoing object, the earthquake precursor observing device according to the present invention is an earthquake precursor observing device for observing an earthquake precursor based on actually measured earthquake data, which is characterized to include: a data acquisition module which acquires earthquake data actually measured at a plurality of observation points; a pulse calculation module which acquires information of a propagation environment where seismic waves propagate from a hypocenter of an earthquake to each of the observation points, and applies time reversal processing on the seismic waves received at the plurality of observation points by considering the propagation environment to acquire time reversal pulses at each of the observation points; a line calculation module which calculates a parametric line in a length direction of a fault from a distribution of azimuths of frequency spectra of the time reversal pulses acquired by the pulse calculation module; a head searching module which searches a parametric head by analyzing the seismic waves received in the vicinity of the parametric line calculated by the line calculation module; and a monitoring module which monitors developments of a crack in the fault by observing the parametric head searched by the head searching module.

The earthquake precursor observing method according to the present invention is an earthquake precursor observing method for observing an earthquake precursor based on actually measured earthquake data, and the method is structured to include: acquiring earthquake data actually measured at a plurality of observation points; acquiring information of a propagation environment where seismic waves propagate from a hypocenter of an earthquake to each of the observation points; acquiring time reversal pulses at each of the observation points by applying time reversal processing on seismic waves received at the plurality of observation points by considering the propagation environment; and calculating a parametric line in a length direction of a fault from a distribution of azimuths of frequency spectra of the time reversal pulses acquired; searching a parametric head by analyzing the seismic waves received in the vicinity of the calculated parametric line; and monitoring developments of a crack in the fault by observing the searched parametric head.

The earthquake precursor observing program according to the present invention is an earthquake precursor observing program for observing an earthquake precursor based on actually measured earthquake data, which is structured to cause a computer to build: a data acquisition module which acquires earthquake data actually measured at a plurality of observation points; a pulse calculation module which acquires information of a propagation environment where seismic waves propagate from a hypocenter of an earthquake to each of the observation points, and applies time reversal processing on the seismic waves received at the plurality of observation points by considering the propagation environment to acquire time reversal pulses at each of the observation points; a line calculation module which calculates a parametric line in a length direction of a fault from a distribution of azimuths of frequency spectra of the time reversal pulses acquired by the pulse calculation module; a head searching module which searches a parametric head by analyzing the seismic waves received in the vicinity of the parametric line calculated by the line calculation module; and a monitoring module which monitors developments of a crack in the fault by observing the parametric head searched by the head searching module.

As described above, the present invention can provide such an effect that it is possible to monitor developments of an active fault in addition to the existence of the active fault and the azimuth characteristics thereof based on the actually measured earthquake data, so that precursor of earthquakes can be monitored accurately.

DETAILED DESCRIPTIONS OF THE PREFERRED EMBODIMENTS

Hereinafter, exemplary embodiments of the present invention will be described in details by referring to the accompanying drawings.

The basic concept of the present invention is to advocate "parametric model" for an earthquake from a verification result based on actually measured data described in latter sections.

Figure 20:
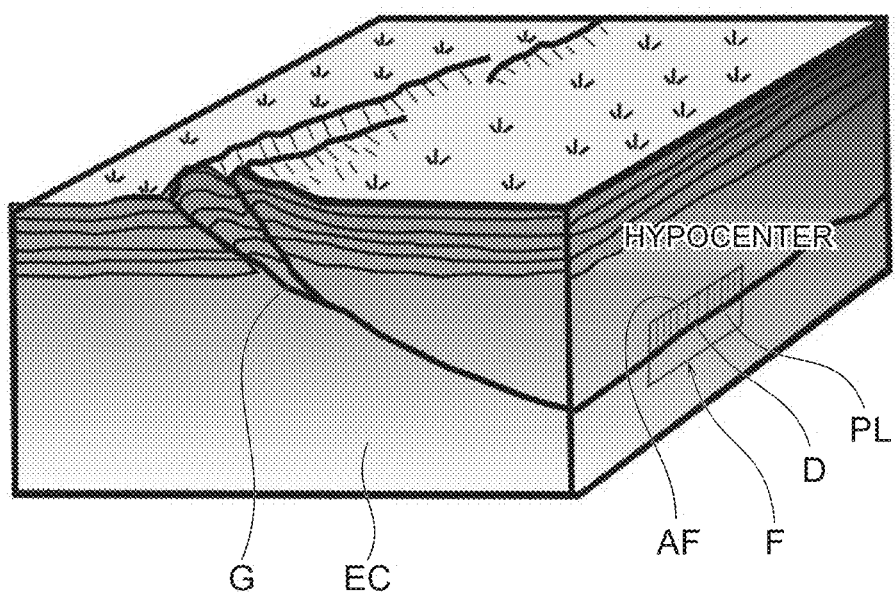
FIG. 20 is an illustration showing a relation between an active fault and a crack.

As shown in FIG. 20, when the pressure for the earth's crust EC is increased, distortion is generated in the earth's crust EC and a crack D is generated in a part thereof. When this crack D runs continuously, an active fault AF is formed. When the crack D repeatedly runs within the active fault AF, the active fault AF is grown to a huge size. Thereby, a geologic layer G of a wide range is ruptured, and a huge earthquake occurs. The crack D keeps traveling within the active fault AF thereafter, and then gradually calms down. This is the process of an earthquake from a precursor, a main shock, and to an aftershock. A series of those earthquake activities occur within a single active fault AF.

With the present invention, the above-described series of earthquake activities are put into a model from its mechanism. The rupture of the earth's crust EC consecutively runs within the active fault AF shown in FIG. 20. When the consecutive rupture occurs, an astounding seismic wave is generated from a hypocenter F shown in FIG. 20 by the so-called parametric effect which is caused when the generated pressures are added in an accumulated manner. This generation mechanism is called a "parametric model". A line along which the consecutive rupture runs is called a "parametric line", and a point on the surface of the earth at which a shock pulse radiated from the parametric line arrives is called a "parametric spot". Regarding a signal received at the parametric spot PS shown in FIG. 19, the head of P-wave is swollen by the parametric effect. This swollen waveform is called a "parametric head".

Figure 19:
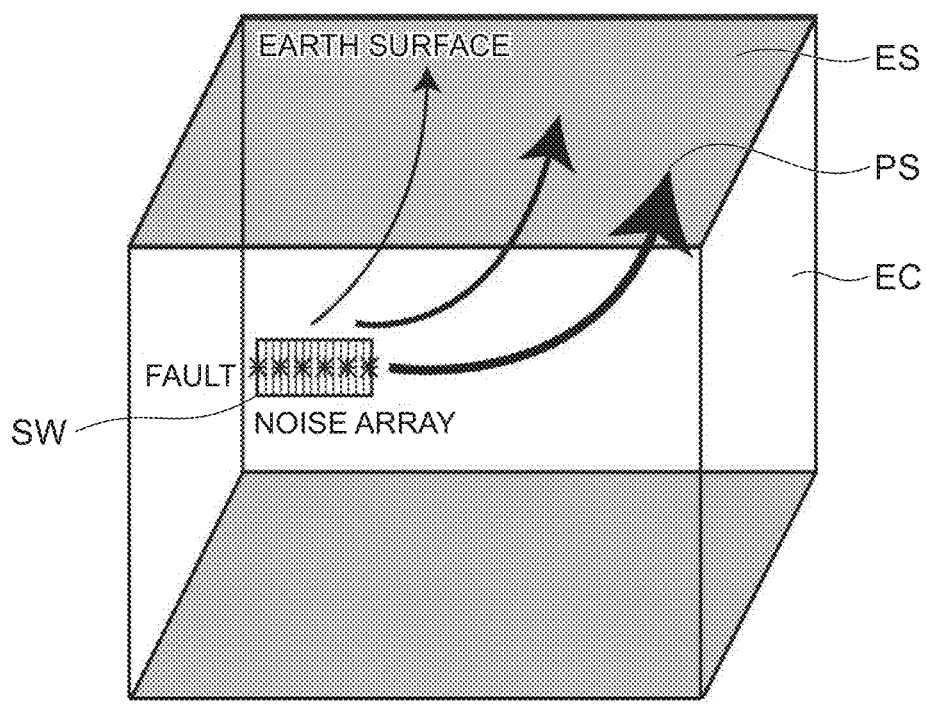
FIG. 19 is a chart for describing the structure for grasping the propagation environment of a seismic wave.

The growing process of the active fault AF causing an earthquake from a precursor, a main shock, and to an aftershock is most reflected upon the parametric spot PS of the earth surface ES shown in FIG. 19. To observe the parametric head PH that is the reflection of the parametric effect as the high-speed consecutive rupture from the stage of a precursor at the parametric spot PS is an appropriate earthquake prediction observing method suited for the mechanism of the active fault AF.

In particular, to check the behavior of the active fault at the stage of a precursor leads to predicting the main shock.

In general, earthquake activities are considered to occur randomly. However, the parametric effect is observed from the time reversal analysis conducted on the earthquake occurred in the Suruga Bay on Aug. 11, 2009 to be described in latter sections. It is not possible to confirm that the earthquake is a universal phenomenon of an active fault only from that result.

Figure 3:
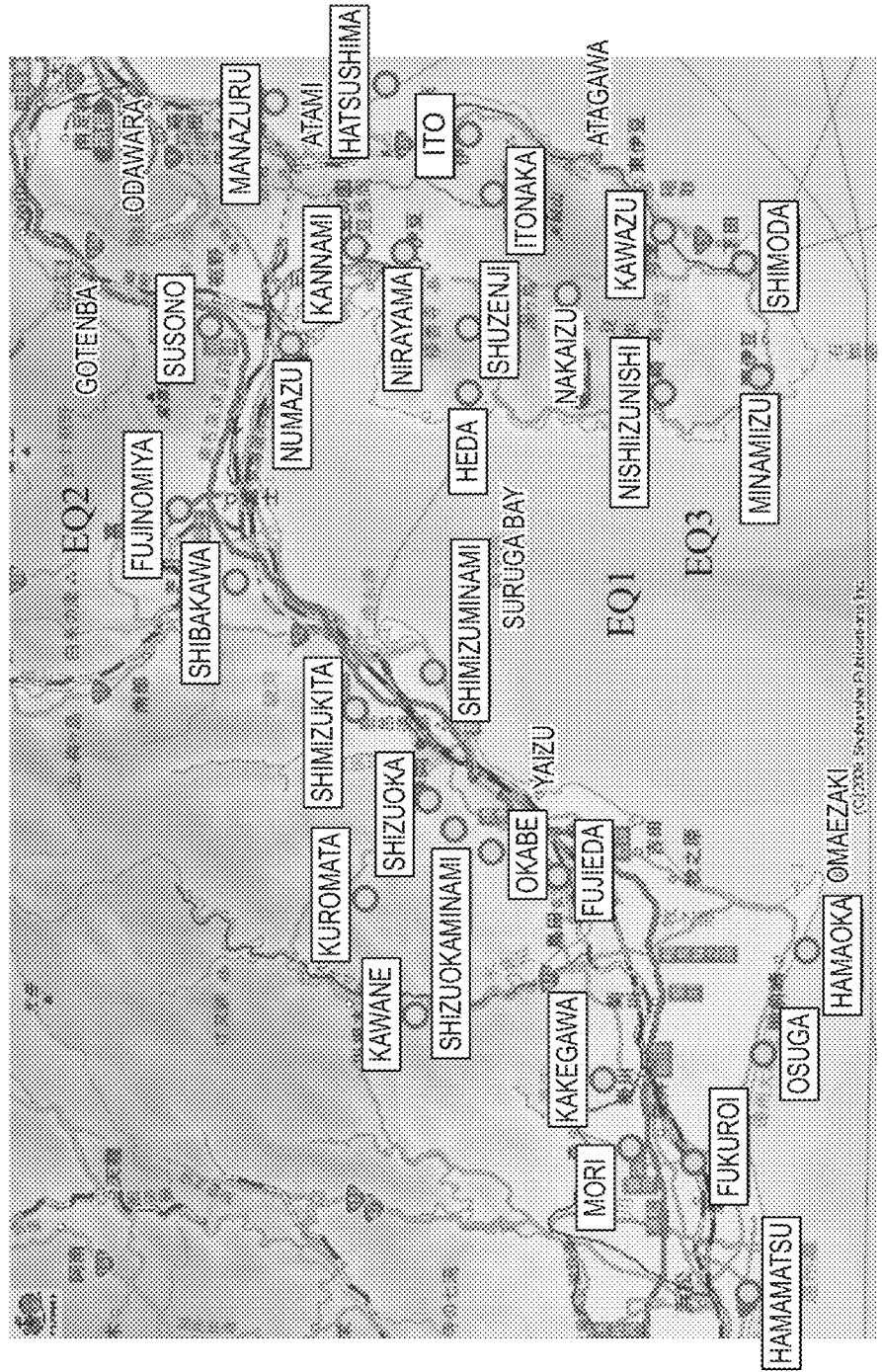
FIG. 3 is a chart showing observation points placed by surrounding the Suruga Bay and also showing the hypocenters of earthquakes occurred within the Suruga Bay.

Thus, all the earthquakes of magnitude 5 or more occurred in the areas from the vicinity of Mt. Fuji to the Suruga Bay in 2009 to 2012 were analyzed. The earthquake EQ1 occurred on Aug. 11, 2009 is an earthquake having the hypocenter in the southern part of the Suruga Bay as shown in FIG. 3, the earthquake EQ2 occurred on Mar. 15, 2011 is an earthquake having the hypocenter in the base of Mt. Fuji as shown in FIG. 3, the earthquake EQ3 occurred on Aug. 1, 2011 is an earthquake having the hypocenter in the southern part of the Suruga Bay as shown in FIG. 3, and the earthquake EQ4 occurred on Jan. 28, 2012 is an earthquake having the hypocenter in the vicinity of the Lake Kawaguchi as shown in FIG. 3. The hypocenters of the earthquakes, the intensity, the parametric spots, the hypocenter depth, and the like of the analyzed four earthquakes are shown as a list in a following table.

| Earthquake Discriminating Code | Occurrence Date | Hypocenter | Magnitude | Parametric Spot (PS) | Hypocenter Depth |
|---|---|---|---|---|---|
| EQ1 | 2009 Aug. 11 | South of Suruga Bay | M6.5 | Nishiizunishi | 23.3 km |
| EQ2 | 2011 Mar. 15 | Base of Mt. Fuji | M6.4 | Nishinohara | 14.3 km |
| EQ3 | 2011 Aug. 1 | South of Suruga Bay | M6.2 | Manazuru | 22.8 km |

| Earthquake Discriminating Code | Occurrence Date | Hypocenter | Magnitude | Parametric Spot (PS) | Hypocenter Depth |
| --- | --- | --- | --- | --- | --- |
| EQ4 | 2012 Jan. 28 | Vicinity of Lake Kawaguchi | M5.4 | Komagane | 18.2 km |

Figure 18:
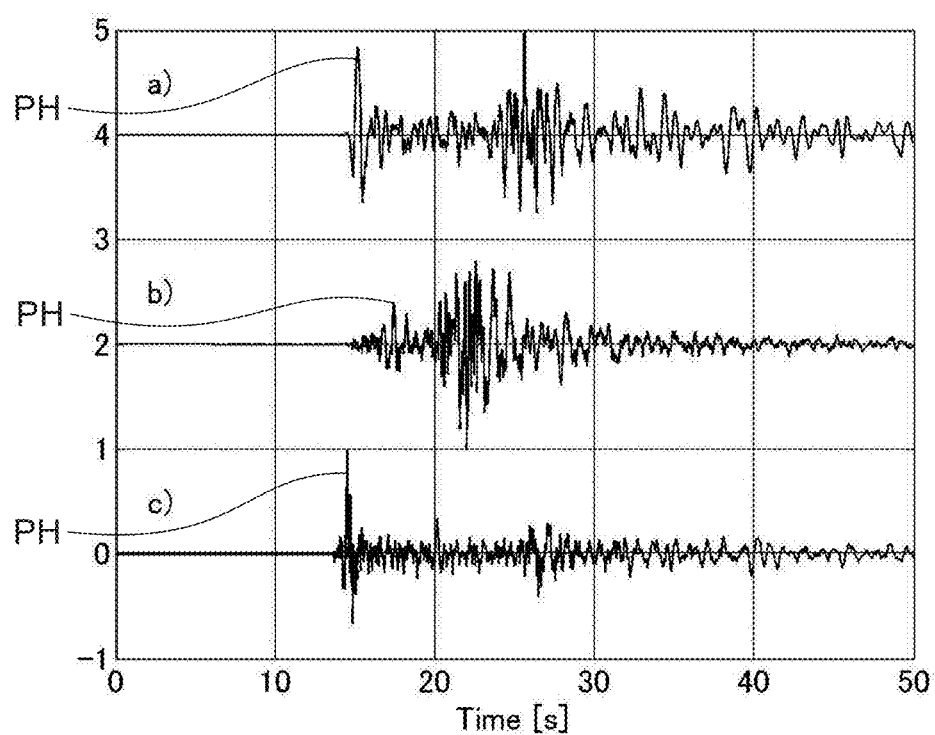
FIG. 18 is a chart showing an analyzed result of a seismic wave for verifying "parametric model" for an earthquake, which is advocated from a verification result based on actually measure data.

For showing that the parametric model can be established with all of those earthquakes EQ1 to EQ4, the parametric spots (PS) of those earthquakes are also shown therein. Further, FIG. 18 shows the parametric heads PH observed at those parametric spots (PS). The lateral axis in FIG. 18 is a time axis for comparing the seismic waves by aligning the origins of a plurality of earthquake pulses, and it should be noted that the lateral axis does not show the absolute time. Furthermore, the longitudinal axis is defined as a velocity amplitude axis for showing velocity amplitudes of a plurality of seismic waves in a relatively and vertically overlapped manner by standardizing those with the maximum amplitude for comparing the velocity amplitudes, and it should be noted that the longitudinal axis does not show the absolute velocity amplitude.

In FIG. 18, a) shows a received wave signal of an earthquake in Manazuru that is the parametric spot PS for the earthquake EQ3, b) shows a received wave signal of an earthquake in Nishinohara that is the parametric sport PS for the earthquake EQ2, and c) shows a received wave signal of an earthquake in Komagane that is the parametric sport PS for the earthquake EQ4.

As clear from FIG. 18, the parametric heads PH are confirmed for all the wave signals received at the observation points that are the parametric spots PS for the earthquake. This makes it evident that the parametric model is established. Note that b) of FIG. 18 shows the received wave signal of the earthquake received at the observation point slightly shifted from the parametric line PL to be described later, and the waveform thereof is deformed compared to those of the received wave signals shown in a) and c) of FIG. 18. However, the tendency of the parametric head PH located at the head part is shown clearly.

Next, it is verified that the parametric model advocated by the Inventors of the present invention, i.e., to observe the parametric head PH as the reflection of the parametric effect that is the high-speed consecutive rupture at the parametric spot PS from the stage of the precursor, is an appropriate earthquake prediction observing method suited for the mechanism of the active fault AF.

The exemplary embodiment of the present invention is intended to monitor developments of an active fault based on the data of earthquakes acquired by public organizations regarding earthquakes without performing engineering works.

The vibration at the hypocenter was acquired by applying time reversal processing on the seismic wave of the earthquake (earthquake EQ1) occurred in the southern part of the Suruga Bay on Aug. 11, 2009. In the periphery of the Suruga Bay, many observation points are placed by surrounding the hypocenter, so that the hypocenter can be checked in a wide angle range. This is clear from the papers presented at the academic society regarding the results of the studies done by the Inventors of the present Invention, i.e., T. Kikuchi and K. Mizutani: Academic Publication of the Acoustical Society of Japan, 2-2-1 (2011, 9), and T. Kikuchi and K. Mizutani: Proc. Symp. Ultrasonic Electronics 32 (2011) 35.

As a result, it was made clear that the hypocenter corresponds to the sound source which moves at a high speed in a specific direction. In the direction along which the sound moves at a high speed, a sharp seismic wave beam is formed by the parametric effect. In the direction towards which the beam wave propagates, the pressures are added in an accumulated manner. Thus, the amplitude of the head part of the parametric pulse becomes large. This is named as the parametric head PH. This parametric head PH appears not only with the main shock and the aftershock but also with the precursor, so that it can be used for predicting the occurrence of earthquakes as the criteria for knowing the developments of the active fault.

While the phase conjugation wave is studied first in the field of optical science, it is now being studied in various fields. In the field of underwater acoustic effect where the frequency is extremely lower than the cases of light and radio waves, digital signal processing can be done easily. Thus, the study thereof is advanced, so that not only the phase conjugation wave in the frequency domain but also time reversal of the time domain is being studied. The sound pressure $P_{tr}$ of the time reversal wave under the water is expressed with a following formula. As a paper regarding the sound pressure $P_{tr}$ of the time reversal wave under the water, there is the paper of W. A. Kuperman et al.: J. Acoust. Soc. Am. 103, 25 (1998).

The paper regarding the sound pressure of the time reversal wave under the water corroborates that an acoustic wave from a sound source placed under the water is received at a transducer array placed with a distance provided therebetween, time reversal processing is applied on the received wave, the acoustic wave on which the time reversal processing is applied is radiated into the water from the transducer array, and the acoustic wave is converged to the sound source.

$$P_{tr}(r, z; t) = \sum_{m=1}^{M} \int G_\omega(r, z, z_m) G_\omega^*(R; z_m, z_s) e^{i\omega T} S^*(\omega) e^{-i\omega t} d\omega \quad (1)$$

Note here that
$G_\omega(R; z_m, z_s)$
is Green's function from the sound source to the transducer array element m,
$G_\omega(r; z, z_m)$
is Green's function from the array element m to a point r, and
$S(\omega)$
is a spectrum of the wave emitted from the sound source. Note that r, z, t and ω show the distance, the depth, the time, and the angular frequency, respectively. The formula is a conjugation integral calculation of the so-called outward propagation function from the sound source to the transducer array and the backward propagation function from the transducer array to the sound source.

Thus, empirically, it is equivalent to perform time reversal and to reradiate the signal received at the transducer array to form a pulse in the vicinity of the original sound source. This formula is proved by an experiment conducted in the actual sea area by W. A. Kuperman et. al. mentioned above.

This theory is applied to the seismic wave. That is, the time reversal processing based on formula (1) is applied on the seismic waves received actually by seismometers, and the time-reversed seismic waves are radiated in a propagation simulation. Thereby, pulses can be formed in the vicinity of the hypocenter that corresponds to the sound source. Therefore, the vicinity of the position where the pulses are formed is the vicinity of the hypocenter of an earthquake.

The hypocenters of the Suruga Bay earthquake and the observation points (marked with circles) are shown in FIG. 3. In FIG. 3, the hypocenter of the earthquake occurred on Aug. 11, 2009 is marked with "X", and the hypocenter of the earthquake occurred on Aug. 1, 2011 is marked with "Y".

As can be seen from FIG. 3, there are a great number of observation points marked with circles placed in the Suruga Bay by surrounding the hypocenters EQ1 and EQ3. Thus, vibrations of the hypocenters can be checked with a wide angle range. However, the depth of the seismometers placed at each of the observation points are largely dispersed from 776 m above sea level in Honkawane to −1006 m from sea level in Hamamatsu.

The seismometers placed at each of the observation points observe the three kinds of vibration velocities in the vertical direction and in the horizontal directions (east to west, south to north) at all times. The measured data can be acquired from Hi-net of the National Research Institute for Earth Science and Disaster Prevention.

Time reversal processing based on Formula (1) is applied on the signals of the seismic waves of the earthquake (EQ1) occurred on Aug. 11, 2009 received at each of the observation points to acquire the pulse formed in the position of the hypocenter. This pulse is called a time reversal pulse. According to the time reversal theory, the time reversal pulse is equivalent to the vibration (corresponds to the sound under the water) radiated by the hypocenter which corresponds to the sound source.

In general, a low frequency sound source does not have the directivity, so that there is no azimuth characteristic in the time reversal pulse of the low frequency underwater sound source. For example, like the case of the sound of a temple bell, the same sound is radiated in all the azimuths.

Figure 4:
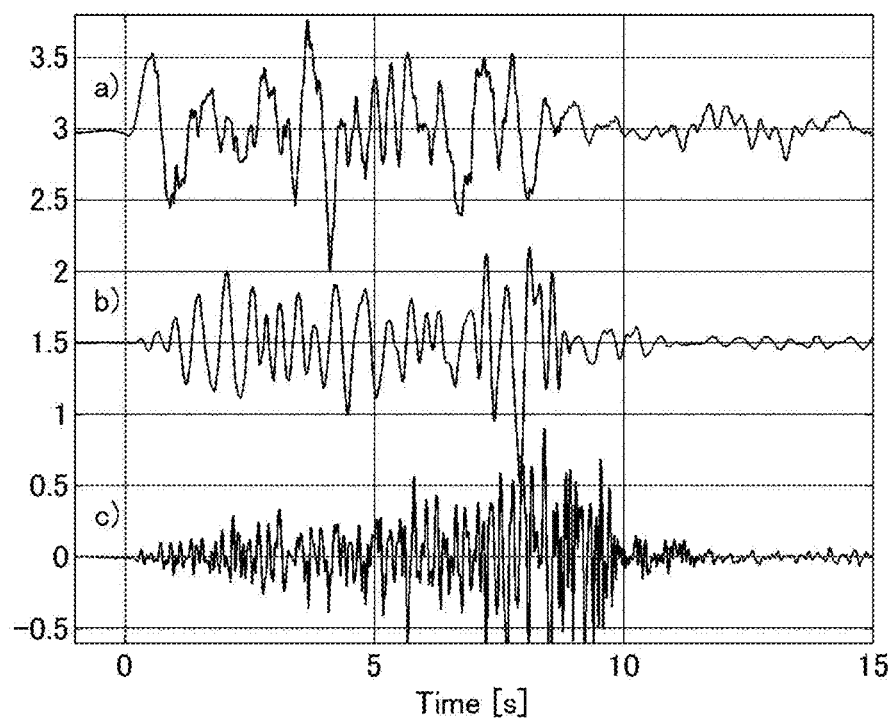
FIG. 4 is a chart showing time reversal pulses at each of the observation points in a case where the azimuths thereof are not the same.

However, largely different results for the time reversal signals of the earthquake EQ1 were acquired depending on each of the observation points. FIG. 4 shows the time reversal pulses corresponding to each of the observation points in Hamamatsu (a), Shibakawa (b), and Numazu (c). The distances from the hypocenter to each of the observation points are 70.3 km, 46.6 km, and 52.1 km, respectively. The depths of the seismometers placed at each of those observation points are −1006 m from the sea level, −225 m from the sea level, and 109 m above the sea level, respectively. Further, assuming that the due north from the hypocenter is the azimuth 0, the azimuth angles of those observation points are 266 degrees, 1 degree, and 28 degrees, respectively.

As described, when the distance, the depth, and the azimuth angle vary, the propagation environment of the seismic waves becomes different. Thus, it is considered that the time reversal pulses thereof are different. However, Formula (1) contains the distance r and the depth z, so that the distance and the depth are considered and automatically corrected. Therefore, it is necessary to correct the influence of the geographical changes of the propagation environment.

In order to correct the influence of the geographical changes of the propagation environment, a propagation environment calculating method utilizing the time reversal robustness is devised to acquire accurate P-wave speed distribution for each of the observation points. That is, according to the time reversal theory, when the signal received at the reception point is time-reversed and radiated, the pulse is converged to the original position of the sound source. At that time, when the propagation environment is shifted from the original condition, the level of convergence is deteriorated depending on the extent of the shift. Thus, the propagation environment where the level of the convergence becomes the maximum is obtained by changing the propagation environments. As described, it is a method for acquiring the optimum propagation environment at each of the observation points by utilizing the time reversal in an inverse problem manner. As papers regarding the robustness, there are the papers of Academic Publication of the Acoustical Society of Japan, 2-1-17 (2009. 3), T. Kikuchi, K. Mizutani: Academic Publication of the Marine Acoustical Society of Japan, 09-37 (2009, 5), T. Kikuchi, K. Mizutani: Academic Publication of the Acoustical Society of Japan, 3-2-13 (2010. 3), and T. Kikuchi and K. Mizutani: Proc. Symp. Ultrasonic Electronics 31 (2010) 575.

From the studies described above, changes in the time reversal pulses occur due to the factors on the reception side such as the positions of the observation points and the depth of the sensors cannot be considered to occur. That is, it is considered that the changes in the time reversal pulse occur due to the vibration at the hypocenter.

Figure 5:
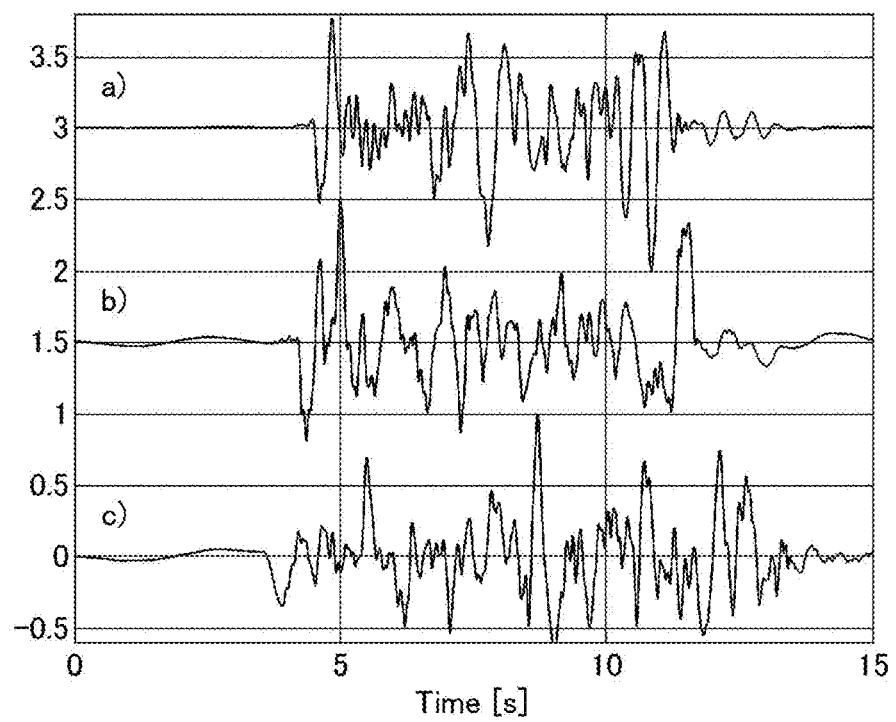
FIG. 5 is a chart showing time reversal pulses at each of the observation points in a case where the azimuths thereof are the same.

Thus, for analyzing the vibration at the hypocenter, the time reversal pulses are rearranged in order of the azimuth angles. As a result, the time reversal pulses at the observation points in the same azimuth are almost matched. FIG. 5 shows the time reversal pulses corresponding to each of the observation points of Osuka (a), Fukuroi (b), and Hamamatsu (c). The distances from the hypocenter to each of the observation points are 49.1 km, 59.7 km, and 73.8 km, respectively. The depths of the seismometers placed at each of those observation points are −65 m from the sea level, −428 m from the sea level, and −1006 m from the sea level, respectively, which are largely different from each other. However, the azimuth angles of those observation points are almost 260 degrees, so that the azimuths thereof are almost the same.

From those results, it is clear that the hypocenter radiates a specific vibration to a specific azimuth and that the vibration largely varies depending on the azimuths. The hypocenter radiating such vibration is an oscillator of what kind cannot be easily predicted.

Next, the equivalent vibration structure of the hypocenter is estimated. From FIG. 4, it can be found that the shapes of the pulses and the vibration frequency regarding the time reversal pulses vary depending on the azimuths. Thus, first, the relation between the azimuth angle and the frequency spectrum is investigated.

Figure 6:
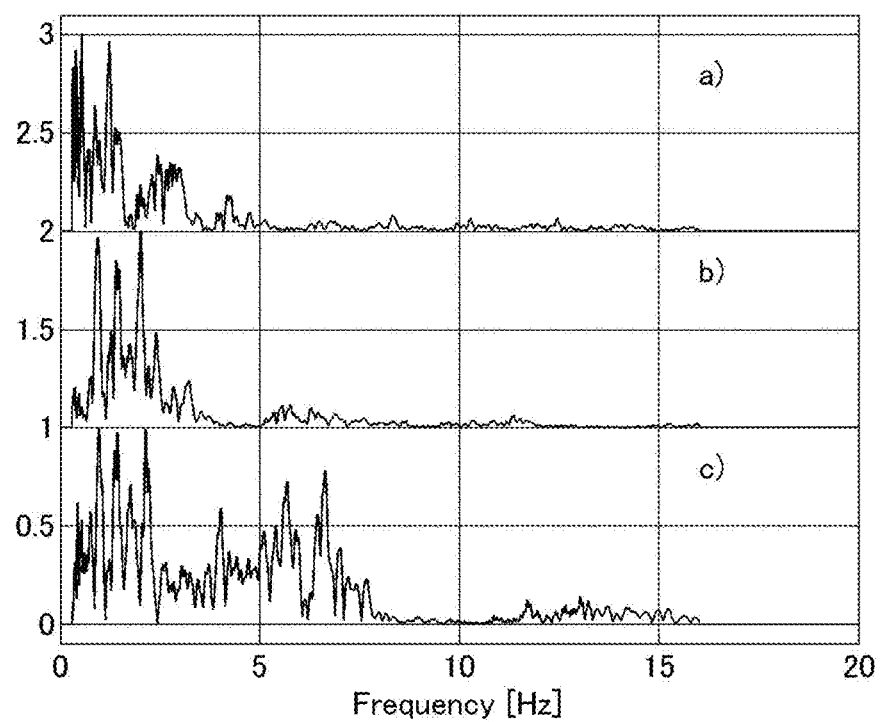
FIG. 6 is a chart showing frequency spectra of the time reversal pulses.

FIG. 6 shows the frequency spectra of the time reversal pulses corresponding to each of the observation points in Hamamatsu (a), Fukuroi (b), and Mori (c). The azimuth angles at each of the observation points in Hamamatsu (a), Fukuroi (b), and Mori (c) are 259 degrees, 271 degrees, and 279 degrees, respectively. It can be found from FIG. 6 that the main frequency component of the time reversal pulses corresponding to the observation points in Hamamatsu (a), Fukuroi (b), and Mori (c) is equal to or less than 2 Hz.

Figure 7:
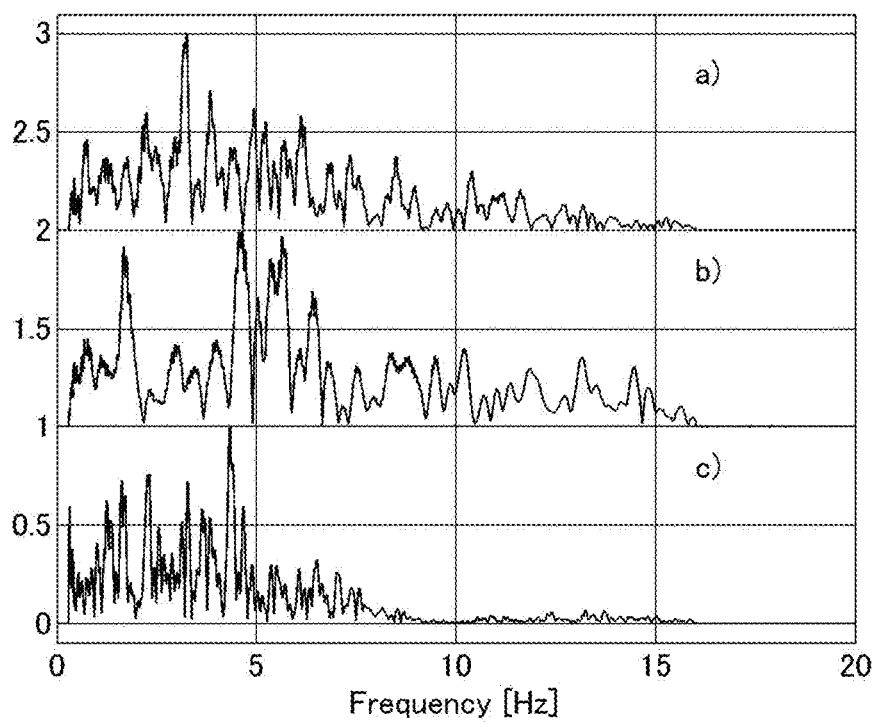
FIG. 7 is a chart showing frequency spectra of the time reversal pulses.

FIG. 7 shows the frequency spectra of the time reversal pulses corresponding to each of the observation points in Susono (a), Numazu (b), and Kannami (c). The azimuth angles at each of the observation points in Susono (a), Numazu (b), and Kannami (c) are 27 degrees, 37 degrees, and 52 degrees, respectively. It can be found from FIG. 7 that the main frequency component of the time reversal pulses corresponding to the observation points in Susono (a), Numazu (b), and Kannami (c) is 4 to 5 Hz.

From FIG. 6 and FIG. 7, it can be found that the frequency spectra of the time reversal pulses become almost consistent when the azimuth angles thereof are close. Further, it can be found that the frequency component of the frequency spectrum is increased when the azimuth angle is shifted from about 250 degrees to about 40 degrees, i.e., from the west to the east.

Next, the peak frequency of the frequency spectrum is checked in order to know the changes in the frequency spectrum with respect to the azimuth angles.

In FIG. 4, FIG. 5, FIG. 6, FIG. 7, FIG. 9, FIG. 10, FIG. 11, and FIG. 12, the lateral axis is a time axis for comparing the seismic waves by aligning the origins of a plurality of earthquake pulses, and it should be noted that the lateral axis does not show the absolute time. Furthermore, the longitudinal axis is defined as a velocity amplitude axis for showing velocity amplitudes of a plurality of seismic waves in a relatively and vertically overlapped manner by standardizing those with the maximum amplitude for comparing the velocity amplitudes, and it should be noted that the longitudinal axis does not show the absolute velocity amplitude.

Figure 8:
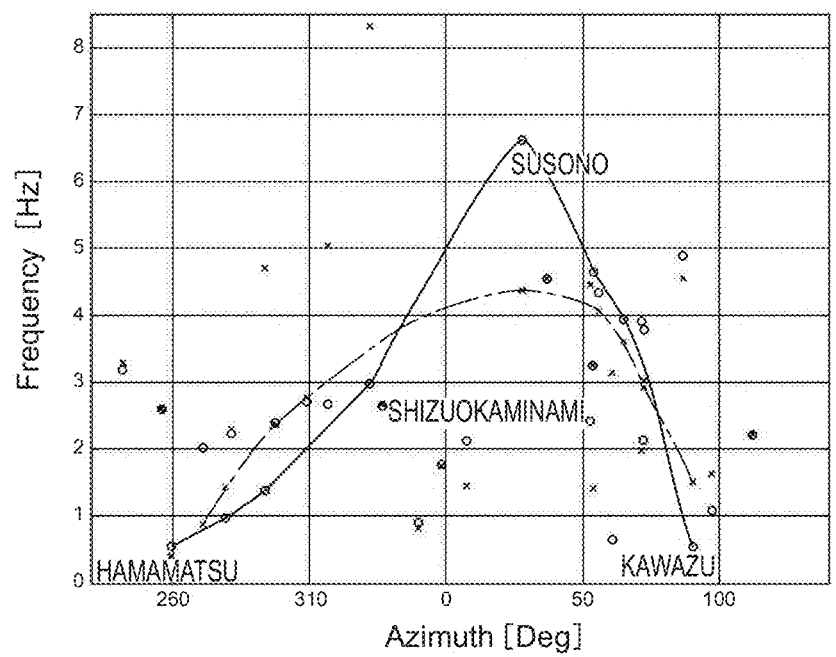
FIG. 8 is a chart showing distributions of peak frequencies of the frequency spectra.

FIG. 8 shows the peak frequency distribution of the frequency spectra for the azimuth angles. In FIG. 8, "◯" shows a peak spectra frequency based on an east-west horizontal velocity component, "x" shows a peak spectra frequency based on a south-north horizontal speed component, the curve of a solid line shows the peak frequency distribution of the frequency spectra regarding the east-west horizontal velocity component, and the curve of an alternate long and short dash line shows the peak frequency distribution of the frequency spectra regarding the south-north horizontal velocity component. In FIG. 8, the lateral axis shows the azimuth angles (degrees) with respect to the hypocenter, and the longitudinal axis shows the frequency (Hz).

The peak frequencies of the frequency spectra correspond to the observation points including Hamamatsu, Shizuoka, Susono, and Kawazu are mapped in FIG. 8, and the shift of the hypocenter, i.e., the parametric line PL, is estimated based on the distribution of the peak frequencies. It was considered possible to grasp the development of the active fault AF shown in FIG. 20 by estimating the parametric line PL.

From the distribution of the frequency peaks shown in FIG. 8, it is evident that the peak frequency increases from Hamamatsu towards Shizuoka, and then the frequency peak drops from Susono towards Kawazu. It was therefore estimated from the distribution of the peak frequencies that the parametric line PL exists on the line connecting Kawazu that is the observation point where the peak frequency drops to the hypocenter EQ1.

Such fluctuation on the peak frequency is not likely to occur in a normal sound source, and it is a change that cannot be explained by the Doppler effect for a normal sound source.

From the result shown in FIG. 8, it is estimated that the hypocenter corresponding to the sound source shifts to the direction of Kawazu. That is, it is estimated from the distribution of the peak frequencies shown in FIG. 8 that the parametric line PL exists on the line connecting Kawazu that is the observation point where the peak frequency drops to the hypocenter EQ1.

Thus, in order to support the estimation that the hypocenter is shifted to the direction of Kawazu, i.e., the estimation that the parametric line PL exists on the line connecting the hypocenter to Kawazu, the frequency spectra of the time reversal pulses corresponding to the observation points in the vicinity of the observation point of Kawazu are checked.

Figure 9:
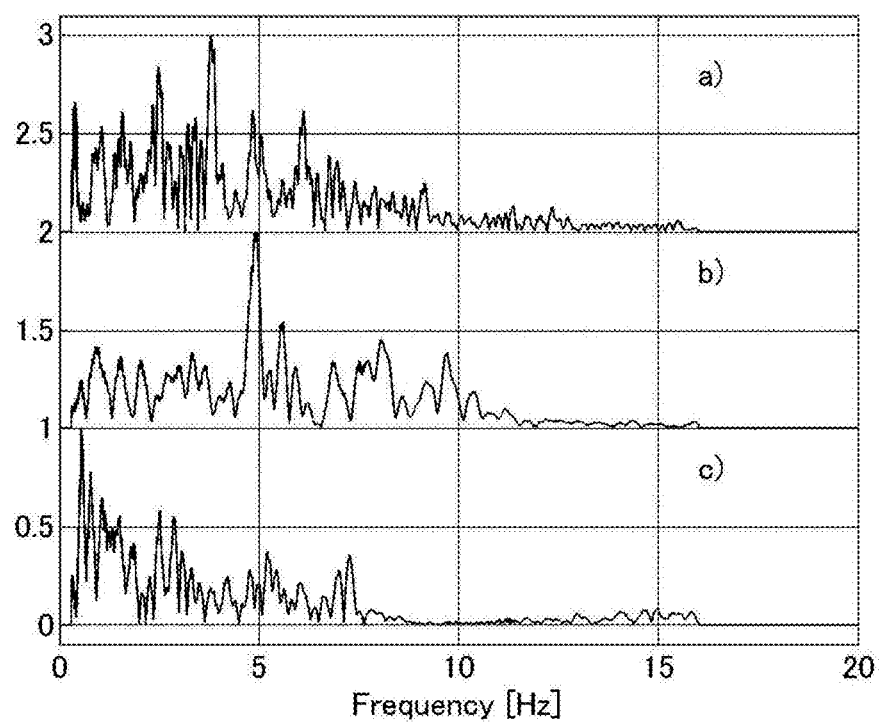
FIG. 9 is a chart showing frequency spectra of the time reversal pulses.

In FIG. 9, a) shows the frequency spectrum of Ito, b) shows the frequency spectrum of Nishiizunishi, and c) shows the frequency spectrum of Kawazu, respectively. In FIG. 9, the east-west horizontal velocity is used.

Figure 10:
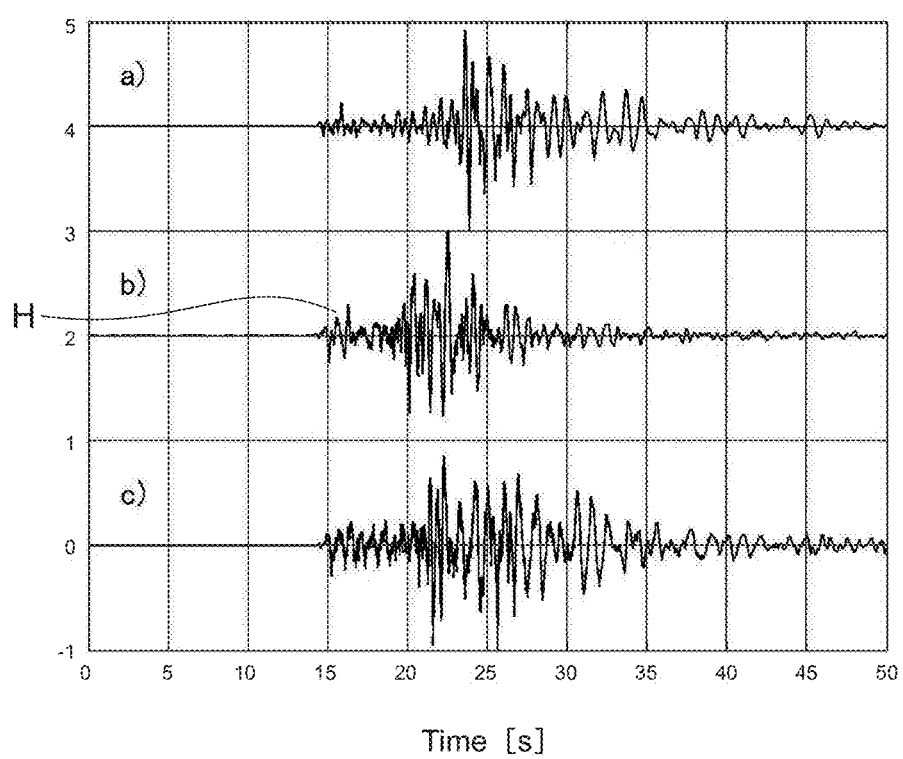
FIG. 10 is a chart showing forms of seismic waves received at observation points.

As can be seen from FIG. 9, a high frequency component is contained at any of the observation points. However, the component of 5 Hz stands high in Nishiizunishi shown in b) of FIG. 9. FIG. 10 shows the seismic wave signals received at each of the observation points in Ito, Nishiizunishi, and Kawazu. Note that a) of FIG. 10 shows the waveform of the seismic wave received at the observation point of Ito, b) shows that of Nishiizunishi, and c) shows that of Kawazu.

In order to show the entire seismic waves, FIG. 10 shows the waveforms of the entire seismic waves constituted with P-wave and S-wave. However, only the P-wave is analyzed. The reason for using only the P-wave for analysis is that P-wave is not easily influenced during the propagation compared to the S-wave.

As can be seen from b) of FIG. 10, it is found that the head part H of the waveform of the P-wave received at the observation point of Nishiizunishi makes a special vibration. While the details of the reason for making such vibration will be described in a latter section, it is generated since the frequency components are superimposed in a specific direction. This is due to the parametric effect to be described in a latter section, so that this specific direction is called as the parametric line PL. The fact that parametric line PL is the length direction of the active fault AF will be described in a latter section. Further, as shown in b) of FIG. 10, the phenomenon where the head part H of the waveform of the received P-wave is swollen is called as the parametric head PH because of the reason for the formation thereof. The parametric head PH will become more evident with an aftershock in a next paragraph. To observe the precursor of an earthquake by the parametric head PH will be described later.

Ito and Kawazu are close to Nishiizunishi in terms of the distance. However, as can be seen from FIG. 10, there is no parametric head PH being observed. This fact is consistent with the fact that the beam generated by the parametric effect is extremely narrow.

Figure 11:
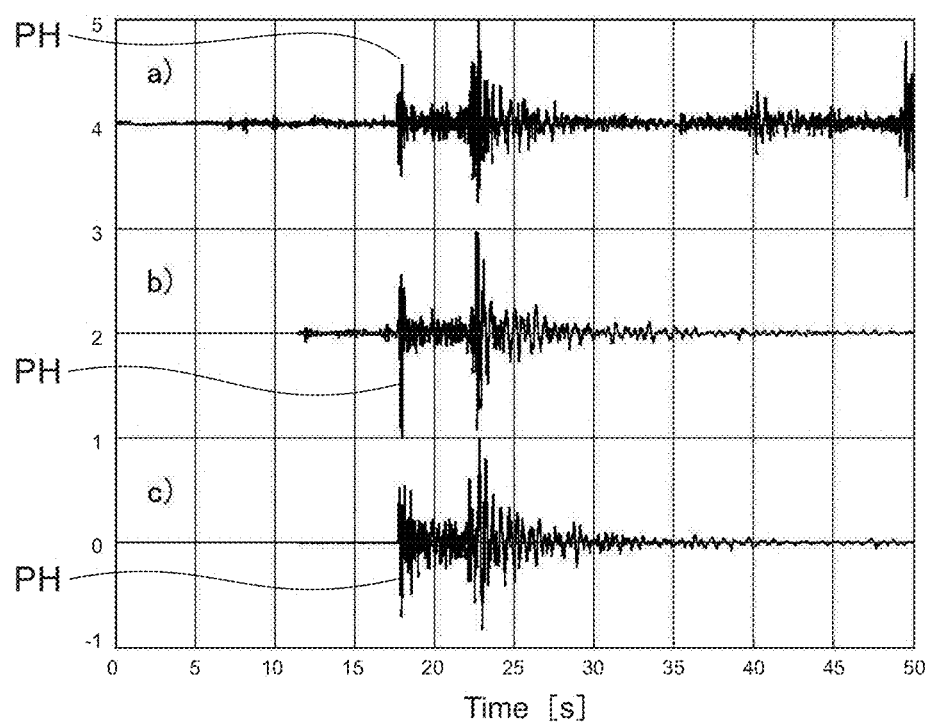
FIG. 11 is a chart showing forms of seismic waves of an aftershock received at an observation point in Nishiizunishi.

In the earlier paragraph, the parametric line PL and the parametric head PH are defined. This phenomenon appears more evidently with a received waveform (earthquake waveform) of an aftershock. FIG. 11 shows the received waveform of the aftershock received at the observation point on the parametric line PL, i.e., in Nishiizunishi. This main shock occurred on Aug. 11, 2009 at 5:07 AM. In FIG. 11, a) is the received waveform of the aftershock occurred at 5:16 AM, b) is the received waveform of the aftershock occurred at 5:20 AM, and c) is the received waveform of the aftershock occurred at 6:06 AM.

As can be seen by comparing FIG. 11 with FIG. 9 and FIG. 10, two large peaks distant from each other in front and back are observed in all the aftershocks. The first peak is the parametric head PH of the P-wave, and the next peak is the peak of the S-wave. The part before the peak of the S-wave is the component of the P-wave, and the extent of the head part thereof is prominent.

As shown in FIG. 20, at a stage where a rupture (crack) D of the active fault AF starts and a weak earthquake (precursor) occurs, an earthquake thereafter is predicted. When the active fault AF is known, a precursor of rupture starting in the active fault AF is checked through searching the parametric head PH at the parametric spots PS shown in FIG. 17 and FIG. 19.

Normally generated earthquakes are occurring in areas where the existent of the active fault AF is not confirmed in advance. Therefore, in the region where it is predicted that crustal distortion is remained, the precursor can be captured through searching the parametric head PH from the observation of a weak earthquake. When there is no observation point in the vicinity of the parametric spot PS, the frequency spectrum of the earthquake considered as the precursor is checked to find whether or not the crack has started to shift at a high speed.

Since the parametric model is established, the application range is expanded due to its characteristic. Even in a case where the parametric spot PS is unknown, behaviors of the active fault can be predicted from the radiation characteristic of the parametric model. Further, the radiation characteristic of the parametric model is largely different from the radiation characteristic of a normal vibration source, so that a great factor can be given to an early forecast system and the like. For example, there may be cases where the amplitude and the frequency component of the P-wave may vary greatly depending on the positional relation between the active fault and the observation points.

The parametric line PL is a line where the sound source shifts at a high speed. In cases of earthquakes, it is considered as the same as the line where the crack D is built in the active fault AF.

It is found that peculiar signals are received on the parametric line PL for the main shock and the aftershock. Thus, for capturing a precursor of an earthquake, it is necessary to grasp the feature of the earthquake occurring on the parametric line PL. Retroactively from the main shock, a) of FIG. 12 shows the east-west horizontal velocity signal received at the observation point in Nishiizunishi on Jan. 26, 2008, b) of FIG. 12 shows the east-west horizontal speed signal received at the observation point in Nishiizunishi on Sep. 30, 2008, and c) of FIG. 12 shows the east-west horizontal velocity signal received at the observation point in Nishiizunishi on Nov. 28, 2008, respectively.

Figure 12:
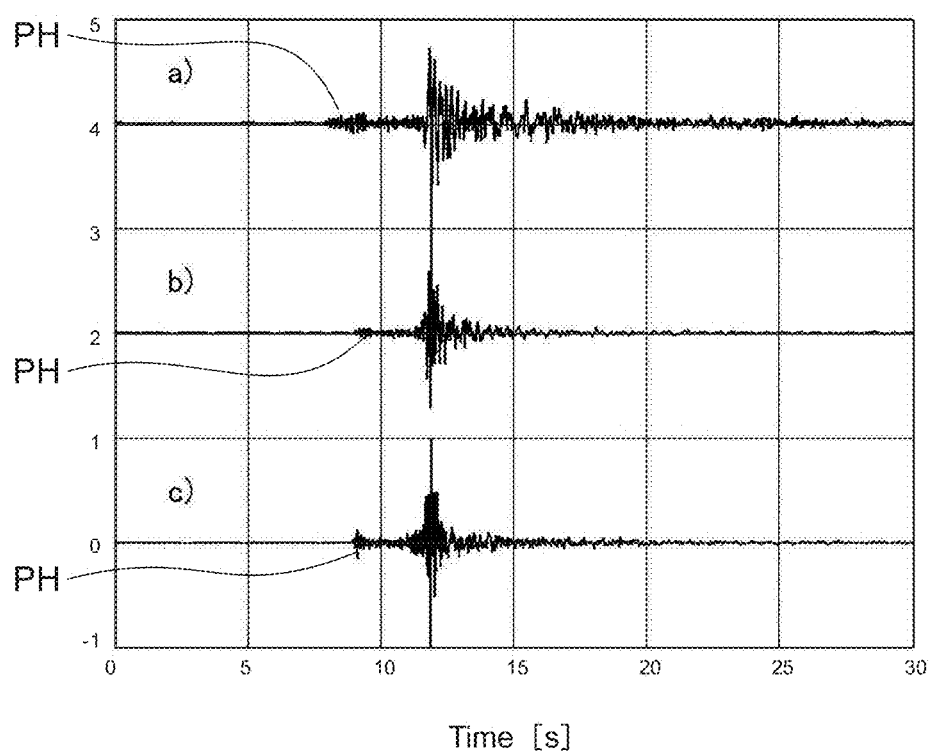
FIG. 12 is a chart showing forms of seismic waves of a precursor received at an observation point in Nishiizunishi.

FIG. 12 shows generally-known waveforms, i.e., the P-wave and the S-wave. However, the Inventors of the present Invention pay attention to the P-wave part in the front section of the waveform shown in FIG. 12 and pay attention to the fact that the head part of the P-wave is swollen gradually. Specifically, the Inventors pay attention to the fact that the parametric heads PH are about to be formed in the received wave signal shown in a) of FIG. 12 and the received wave signal shown in b) of FIG. 12, while the parametric head PH is almost formed on the received wave signal shown in c) of FIG. 12.

As shown in FIG. 20, when the crack D is generated at a certain point within the active fault AF, the crack D may be propagated successively. Accordingly, the hypocenter F of the earthquake is shifted simultaneously. That is, the hypocenter F of the earthquake is shifted according to the shift state of the crack D, so that it is possible to estimate the change in the crack D by following the sound source. Particularly with a large earthquake, the crack D runs abruptly in a certain direction. Therefore, the parametric line PL as shown in FIG. 20 is formed.

Next, the parametric effect of the earthquake vibration will be described. First, the theory of the parametric array will be described. The theory of the parametric array is an issue researched in the field of underwater sound. As a paper regarding this issue, H. Medwin: "Sound in the Sea", (Cambridge University Press 2005) Chapter 4 has been published.

In general, in a case where the extent of the sound source regarding the radiation of the sound wave is sufficiently larger than the wavelength, the directivity of the sound wave beam to be radiated becomes sharp. However, the sound wave radiated from the sound source having the extent about the same as that of the wavelength exhibits almost no directivity. For example, the sound of a temple bell is heard as the same in all directions. On the contrary, devised for radiating the low-frequency sharp sound wave beam with a small sound source is the parametric array.

Figure 13A:
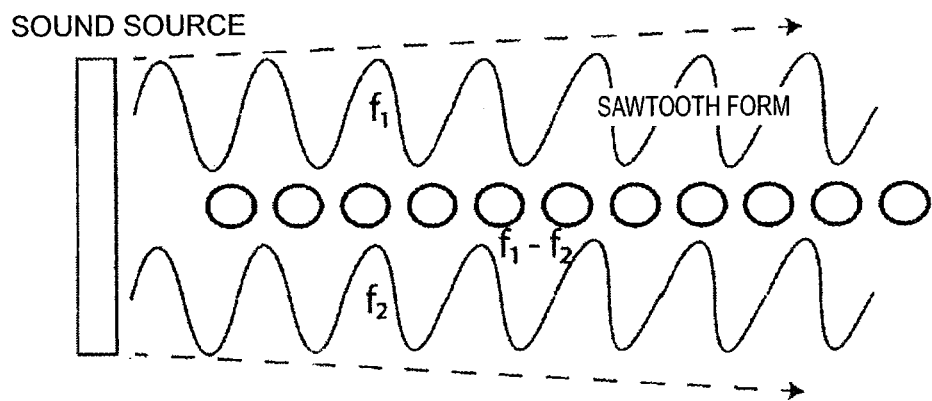
FIGS. 13A and 13B show charts for describing the concept of a parametric array.

FIG. 13A conceptually shows the parametric array. When a high-frequency sound wave is radiated from the sound source, a sharp-width beam as shown with broken lines is radiated. When the sound pressure of the sound wave is increased, a sine wave is gradually shaped into a sawtooth form as shown in FIG. 13A. This is caused by a nonlinear effect of a medium. In the sawtooth region, first, harmonic components such as $2f_1$, $4f_1$ and the like are generated in addition to a high-frequency component of $f_1$.

Similarly, in a case where a strong sound wave $f_2$ is radiated from the sound source, harmonic components such as $2f_2$, $4f_2$ and the like are generated in addition to $f_2$. The harmonic components such as $2f_2$, $4f_2$ and the like generated secondarily are not radiated from the sound source but generated under the water as the sound wave travels when the sound source is propagated under the water.

Next, in a case where the strong sound waves $f_1$ and $f_2$ are radiated simultaneously from the sound source, sum and difference frequency components such as $f_1$-$f_2$ (marked with circle in the drawing) and $f_1$+$f_2$ are generated in addition to the above-described high-frequency components. Here, the difference frequency component of $f_1$-$f_2$ in FIG. 13A is investigated. In a case where a sound wave with such a low difference frequency is radiated from a normal sound source, it becomes a wide angle beam. This is evident from the fact that the sound of a temple bell is of a low frequency and propagated to all directions without directivity.

However, as shown in FIG. 13A, the difference frequency component of $f_1$-$f_2$ in a case where the strong sound waves $f_1$ and $f_2$ are radiated simultaneously from the sound source is generated along with the travel of the primary sound source. Thus, the generation point travels at the same speed and in the same direction as those of the propagation of the sound wave. Therefore, those difference sounds all interfere with a same phase, so that sound waves of narrow beams are to be radiated to a specific direction. That is, the difference frequency component of $f_1$-$f_2$ is generated along with the propagation of the primary sound waves $f_1$ and $f_2$, so that those all propagate at a same speed.

Figure 13B:
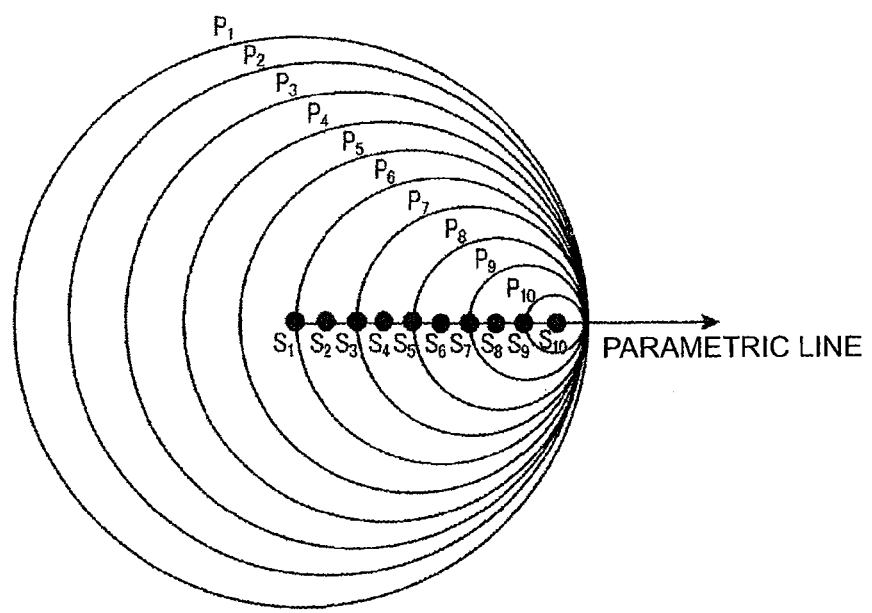

Therefore, as shown in FIG. 13B, when a difference sound $S_1$ travels and reaches point $S_2$ point, a new difference sound is generated from $S_2$. When a difference sound from $S_1$ and $S_2$ reaches point $S_3$, a new difference sound is generated. When a difference sound from $S_1$, $S_2$, and $S_3$ reaches point $S_4$, a new difference sound is generated.

FIG. 13B shows wave front of the sound waves radiated from each point travelled to point $S_{10}$ by repeating the above-described process, i.e., a wave front $P_1$ from $S_1$, a wave front $P_2$ from $S_2$, a wave front $P_3$ from $S_3$, and the like. Those wave fronts are in the same phase in all the front faces of the traveling direction, so that the waves of large amplitude are to be formed.

As described, beams are added in the medium, so that a certain longitudinal array is formed thereby. Thus, it is called a parametric array. The feature of the parametric array is to form a narrow beam even though the sound is of a low frequency. Further, the width of the beam becomes narrower as the length of the parametric array becomes longer.

When the crack D (the hypocenter F corresponding to the sound source) runs along the active fault AF as shown in FIG. 20 in a case of a seismic wave, the crack D runs while the pressures being added up. Thus, it is considered that a same effect as in the parametric array under the water is working. Further, as the length (parametric line PL) of the active fault AF shown in FIG. 20 is longer, i.e., the larger the earthquake is, the beam of the seismic wave becomes narrower.

In the exemplary embodiment of the present invention, the fact that the crack D running through the active fault AF shown in FIG. 20 has the parametric effect is shown by a simulation. It was verified that the time reversal pulses converge to the hypocenter F shown in FIG. 20, i.e., the position of the crack D generated in the active fault AF, when time reversal processing based on Formula (1) is applied to the seismic waves received at the observation points. Therefore, when the time reversal processing based on Formula (1) is used for the seismic wave, it is appropriate to think that the crack D, i.e., the hypocenter F, corresponds to the sound source. Further, it was also verified that the seismic wave is constituted with low frequency components.

Thus, when conducting the simulation, a noise of low-frequency components is set as the crack D shown in FIG. 20. The difference from the case of the underwater in the previous section is that the sound source is a noise. The noise is generated when the crack D is built in the active fault AF shown in FIG. 20. It is considered that there is a duct structure in the propagation medium because the noise is converted to a frequency component during propagation.

In general, a strong stress is applied in a concentrated manner within a geological formation EC where the active fault AF shown in FIG. 20 is generated. It is known that the propagation speed of the part where the high stress is applied is increased partially than the part where no stress is applied.

Figure 14:
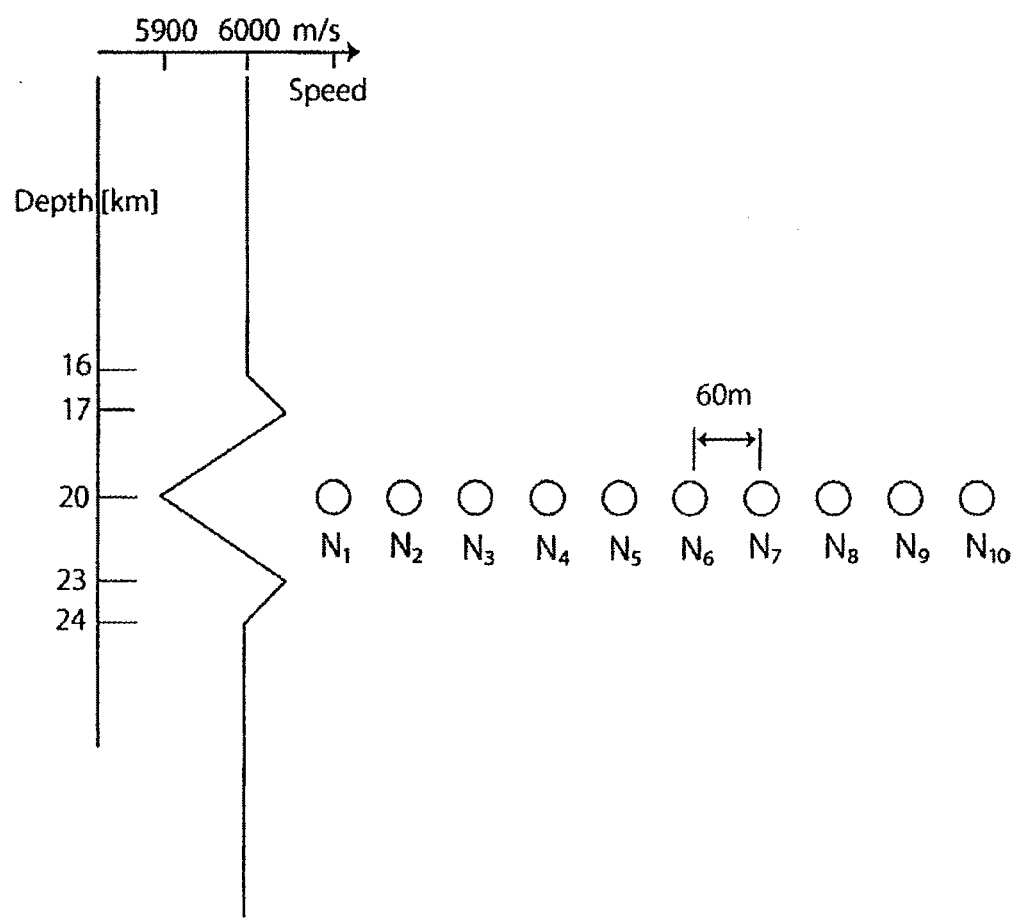
FIG. 14 is a chart showing that a crack in a fault has a parametric effect in the exemplary embodiment of the present invention by showing a simulation.
Figure 15:
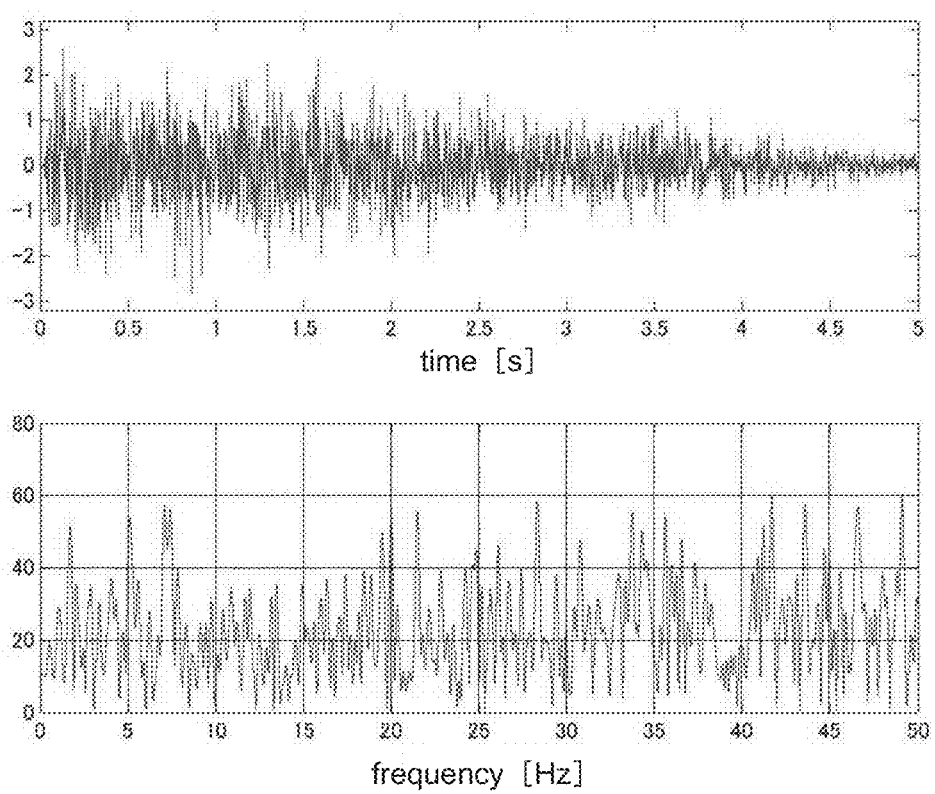
FIG. 15 shows charts of a waveform of a noise forming an earthquake hypocenter corresponding to a sound source and of a frequency spectrum of the noise.

As shown in FIG. 14, it is assumed in the simulation that the speed of the seismic wave changes in the depth direction. A hypocenter assumed as the noise corresponding to a sound source is placed in the depth where the speed is the minimum, e.g., the depth of 20 km, and noise hypocenters $N_1$, $N_2$, $N_3$, - - - traveling within the depth in the horizontal direction are considered. An example of the noise hypocenter as the sound source is shown in the upper chart of FIG. 15. The noise forming the hypocenter is generated with random numbers, so that it is considered to be almost random. The lower chart of FIG. 15 shows the frequency spectrum of the hypocenter (noise). In the upper chart of FIG. 15, the lateral axis is the time (seconds), and the longitudinal axis is the pressure amplitude. In the lower chart of FIG. 15, the lateral axis is the frequency (Hz), and the longitudinal axis is the amplitude.

As shown in FIG. 14, the noise hypocenter travels while radiating at each of the points $N_1$, $N_2$, $N_3$, - - -, so that it is considered to generate the same effect as that of the parametric array.

Figure 16:
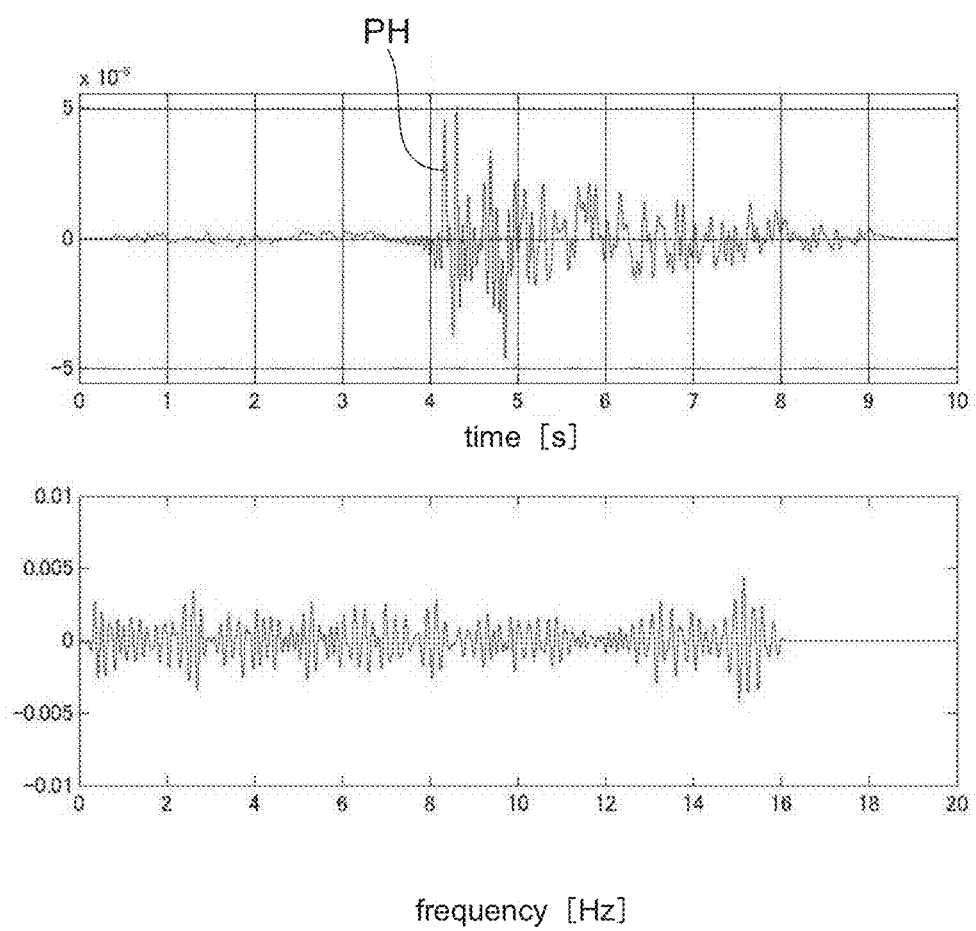
FIG. 16 shows charts showing a waveform of a signal received at an observation point where the noise hypocenter travels for 35 km and showing the frequency spectrum thereof.

Further, the upper chart of FIG. 16 shows the signal received at a point traveled for 35 km from the noise hypocenter as shown in FIG. 14 in the horizontal direction when the noise hypocenter travels while radiating at each of the points $N_1$, $N_2$, $N_3$, - - - as shown in FIG. 14 so that the parametric array length is 1400 m, i.e., when the length of the active hypocenter AF shown in FIG. 20 is 1400 m. In the upper chart of FIG. 16, the lateral axis is the time (seconds), and the longitudinal axis is the pressure amplitude. In the lower chart of FIG. 16, the lateral axis is the frequency (Hz) and the longitudinal axis is the amplitude The distance of 35 km is equivalent to the distance from the earthquake EQ1 shown in FIG. 3 to the observation point in Nishiizunishi. As described above, Nishiizunishi is located on the parametric line PL passing through the hypocenter EQ1.

The lower chart of FIG. 16 shows the frequency spectrum. In the upper chart of FIG. 16, components of high frequencies are gathered in the head part of the received parametric pulse to form the parametric head PH, and low components are dispersed in the rear part. As shown in the upper chart of FIG. 15, the noise is constituted with almost random signals. However, it can be found as shown in FIG. 16 that a specific frequency component is emphasized by the parametric effect while traveling in the duct under the ground, i.e., the parametric head PH is formed.

As described above, the generated pressure is cumulatively added by the progress of the crack in the fault, as known from the phenomenon where the head part of the waveform of the P-wave of seismic waves is swollen. Its physical cause is not known; however, as a possibility, the following reference is cited: V. Pavlov and E. P. Tito: "Transition scattering in stochastically inhomogeneous media," J. Acoust. Soc. Am., 125, 676-689 (2009).

There is a question raised that the above-described parametric line is a characteristic peculiar to the earthquake EQ1 shown in FIG. 3 occurred on Aug. 11, 2009.

Thus, the earthquake EQ3 shown in FIG. 3 occurred on Aug. 1, 2011 was analyzed as well. As a result, it was confirmed that the wave thereof travels from the hypocenter to the direction of the observation point in Manazuru. Further, in the case of the earthquake EQ2 occurred in the vicinity of Mt. Fuji on Mar. 12, 2011, it was also confirmed that the wave thereof travels to the direction of the observation point in Nishinohara. Furthermore, in the case of the earthquake EQ4 occurred in the vicinity of Lake Kawaguchi on Jan. 28, 2012, it was also confirmed that the wave thereof travels to the direction of the observation point in Komagane. In general, it is considered that most of seismic waves are generated due to the shift in the active fault AF shown in FIG. 20.

Thus, the method is considered effective as a means for observing the precursors for many earthquakes.

Based on the technical analysis described above, the earthquake precursor observing device according to the present invention is designed as follows.

Figure 1:
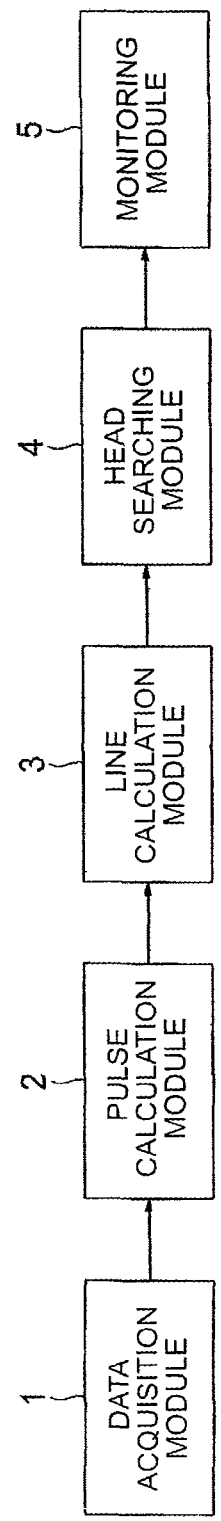
FIG. 1 is a block diagram showing the structure of an earthquake precursor observing device according to an exemplary embodiment of the present invention.

That is, as shown in FIG. 1, the earthquake precursor observing device according to the exemplary embodiment of the present invention is built as the structure which includes: a data acquisition module 1 which acquires earthquake data actually measured at a plurality of observation points; a pulse calculation module 2 which acquires information of a propagation environment where seismic waves propagate from the hypocenter of an earthquake to each of the observation points, and applies time reversal processing on the seismic waves received at the plurality of observation points by considering the propagation environment to acquire time reversal pulses at each of the observation points; a line calculation module 3 which calculates the parametric line PL in the length direction of an active fault from a distribution of azimuths of frequency spectra of the time reversal pulses acquired by the pulse calculation module 2; a head searching module 4 which searches the parametric head PH by analyzing the seismic waves received on the parametric line PL calculated by the line calculation module 3 or at the parametric spot PS in the vicinity thereof; and a monitoring module 5 which monitors developments of the active fault by observing the parametric head PH searched by the head searching module 4.

Figure 17:
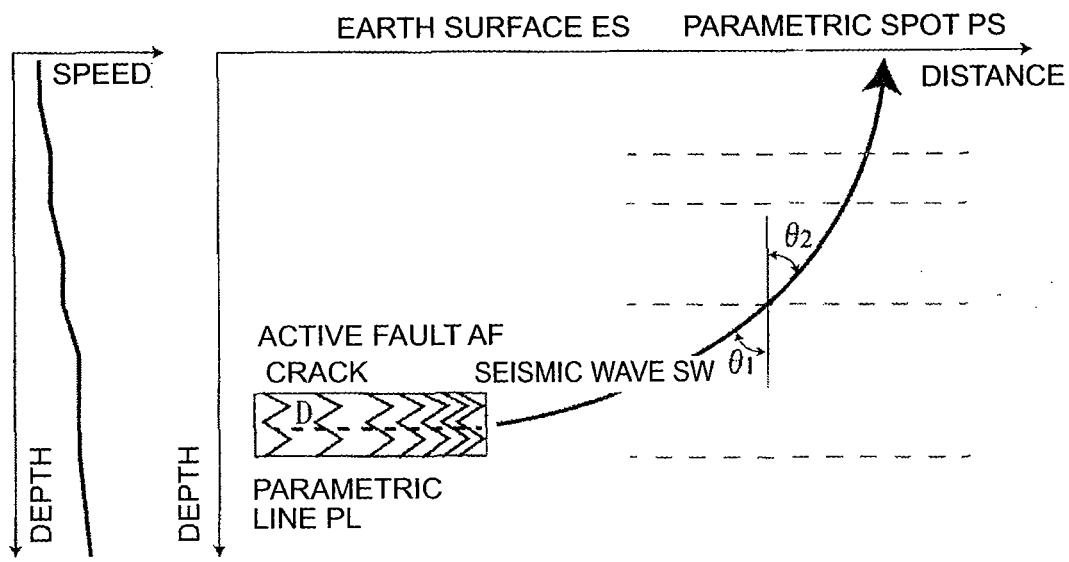
FIG. 17 is a chart for describing the structure for grasping the propagation environment of a seismic wave.

Processing done by the pulse calculation module 2 for acquiring the time reversal pulse will be described. For the seismic wave radiated from the hypocenter, it is necessary to know the accurate propagation environment, i.e., the P-wave speed profile. As can be seen from FIG. 5, the waveforms of the time reversal pulses are similar. However, there is a slight shift in the start time axes of the time reversal pulses. Further, in the seismic wave SW radiated from a deep fault, noise hypocenters are often arranged horizontally as an array noise as shown in FIG. 17 and FIG. 19. Thus, the seismic wave SW moves up as shown in FIG. 17 and FIG. 19 after propagating horizontally for a while, and reaches the earth surface ES. As the route thereof, the seismic wave SW makes incident into the boundary between the layers at θ1 and exits at θ2 according to Snell's law. The point on the earth surface ES at which the seismic wave SW reached is the parametric spot PS. The seismic wave SW propagates underground, so that it is necessary to grasp the propagation environment.

In order to overcome that issue, as described above, the pulse calculation module 2 grasps the propagation environment by employing a propagation environment calculating method which utilizes the time reversal robustness, and calculates the time reversal pulse by applying time reversal to the seismic wave received at the observation point by considering the propagation environment.

While the earthquake precursor observing device according to the exemplary embodiment of the present invention shown in FIG. 1 is built as hardware, it is not limited only to such case. The pulse calculation module 2, the line calculation module 3, the head searching module 4, and the monitoring module 5 may be built on software by causing a computer to execute an earthquake precursor observing program.

Next, a case of performing a method for monitoring precursors of earthquakes by using the earthquake precursor observing device according to the exemplary embodiment of the present invention will be described by referring to FIG. 2.

Figure 2:
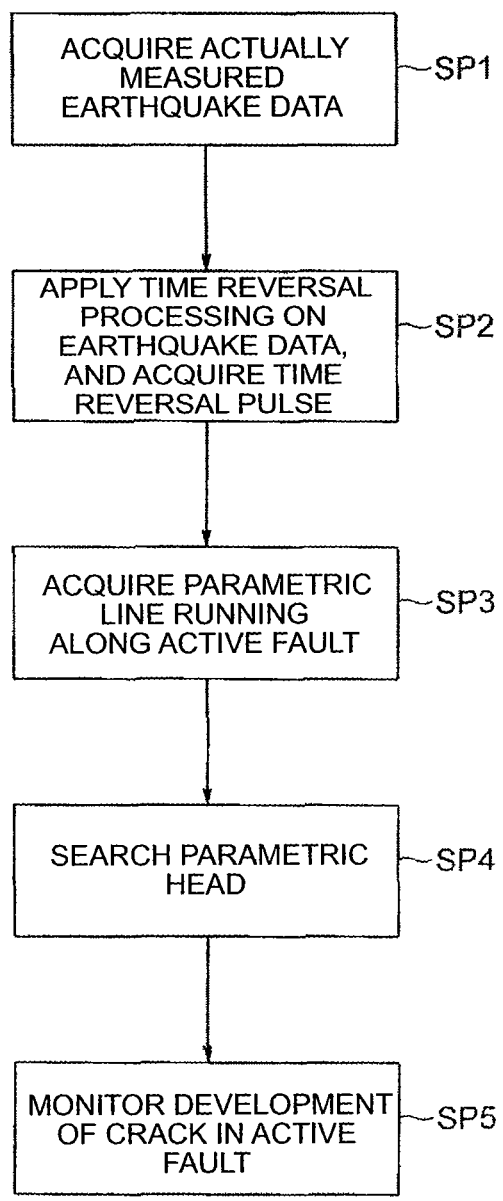
FIG. 2 is a flowchart for describing an earthquake precursor observing method according to the exemplary embodiment of the present invention.

The data acquisition module 1 acquires earthquake data actually measured at a plurality of observation points marked with circles in FIG. 3 (step SP1 of FIG. 2). The earthquake data is managed by the National Research Institute for Earth Science and Disaster Prevention, so that the data can be downloaded from Hi-net of the National Research Institute for Earth Science and Disaster Prevention. The data acquisition module 1 gives the acquired data to the pulse calculation module 2.

The pulse calculation module 2 grasps the propagation environment regarding the seismic waves received at the plurality of observation points, applies the time reversal processing based on Formula (1) on the seismic waves by considering the propagation environment, and acquires the time reversal pulses at each of the observation points as shown in FIG. 5 (step SP2 of FIG. 2). The pulse calculation module 2 gives the time reversal pulses acquired for each of the observation points to the line calculation module 3.

The line calculation module 3 creates the distribution of the peak frequencies for the azimuth angles of the frequency spectra of the time reversal pulses acquired for each of the observation points, i.e. the distribution of the azimuths of the frequency spectra of the time reversal pulses shown in FIG. 8, and calculates the parametric line PL in the length direction of the active fault from the distribution of the azimuths of the frequency spectra (step SP3 of FIG. 2). Specifically, the line calculation module 3 calculates the line which connects the observation point where the peak frequency increases and then drops thereafter based on the distribution of the peak frequencies for the azimuth angles of the frequency spectra of the time reversal pulses acquired for each of the observation points shown in FIG. 8 to the hypocenter EQ1 or EQ2 as the parametric line PL. This parametric line PL is the direction of the crack D built in the active fault AF shown in FIG. 20.

The head searching module 4 searches the parametric head PH by analyzing the seismic waves received at the observation points on the parametric line PL or in the vicinity thereof as shown in FIG. 9 to FIG. 12 based on the information of the parametric line PL calculated by the line calculation module 3 (step SP4 of FIG. 2).

The head searching module 4 searched the parametric head PH by analyzing the waveforms of the received seismic waves for all the earthquakes including a weak earthquake with a magnitude of about 2. In that case, the head searching module 4 is required to analyze the waveforms of the earthquakes for the three velocity components of the vertical and horizontal (east to west, south to north) directions actually measured by the seismometers.

The monitoring module 5 stores the information of the parametric head PH searched by the head searching module 4 and monitors developments of the active fault AF shown in FIG. 20 by observing the parametric head PH searched by the head searching module 4 through comparing the information of the parametric heads PH stored previously with the information of the parametric head PH searched by the head searching module 4 based on a new occurrence of earthquake (step SP5 of FIG. 2).

As described above, it is already known that signals peculiar to the main shock and the aftershock are received on the parametric line PL. In order to capture a precursor of an earthquake, it is necessary to grasp the feature of the earthquakes to be generated on the parametric line PL.

Therefore, the monitoring module 5 stores the information of the parametric head PH searched from the seismic waves of the main shock, the aftershock, and the shock going back from the main shock in terms of time and compares those pieces of information to observe the parametric head PH searched by the head searching module 4 for monitoring the developments of the active fault AF shown in FIG. 20.

Specifically, the monitoring module 5 monitors the state that the parametric heads PH are about to be formed in the received wave signal shown in a) of FIG. 12 and the received wave signal shown in b) of FIG. 12 while the parametric head PH is almost formed on the received wave signal shown in c) of FIG. 12, and judges that the crack of the fault is being developed when the information of the parametric head shows that the parametric head is actualized as in a), b) and c) of FIG. 12. Prediction of earthquakes is done by earthquake experts based on the information outputted from the monitoring module 5.

Confirmation of the parametric head PH by the searching module 4 will be described in details. The parametric pulse traveling on the parametric line PL forms the parametric head PH. However, in a case where the parametric line PL is undersea, it is not possible to place the seismometers in that direction. Even if it is possible, the seismometers placed on the surface of the seabed is influenced by seawater layers. Thus, the waveform changes greatly, so that it is difficult to utilize them. In that case, it is also possible to verify the waves received outside the parametric line, particularly the waves received at angles orthogonal to the parametric line PL. Placement of the seismometers will be described. In a preliminary research, the observed data acquired from Hi-net of the National Research Institute for Earth Science and Disaster Prevention can be utilized. However, those observation points may not necessarily be placed on the parametric line. It is necessary to build a system that makes it possible to perform observations at all times with a plurality of seismometers provided in the vicinity of the parametric line.

As described above, with the exemplary embodiment of the present invention, it is evident that the growing processing of the active fault from a precursor to a main shock and an aftershock is most reflected upon the parametric spot PS on the earth surface ES shown in FIG. 19. The exemplary embodiment of the present invention can provide the appropriate earthquake prediction observing method suited for the mechanism of the active fault AF, which can observe the parametric head as the reflection of the parametric effect that is a high-speed continuous rupture on the parametric spot PS from the stage of a precursor. In particular, behaviors of the active fault can be checked at the stage of the precursor, thereby making it possible to predict the main shock.

In a case where existence of the active fault is already confirmed, developments of the active fault can be monitored. However, there are cases where an earthquake occurs in areas other than the indicated active fault. According to the exemplary embodiment of the present invention, the parametric head PH appears not only for the main shock and the aftershock but also for the precursor.

Therefore, in a case where existence of active faults is unknown, parametric pulses are calculated by applying time reversal based on Formula (1) on the seismic waves acquired based on the earthquake data, the distribution of the peak frequencies shown in FIG. 8 is created based on the parametric pulses acquired at each of the observation points, the observation point where the peak frequency drops is found, and the parametric pulse at that observation point is observed to find the parametric line PL which connects the observation point to the hypocenter. Thereby, it is possible to grasp the existence of the active fault AF shown in FIG. 20.

As described above, the exemplary embodiment of the present invention makes it possible to monitor developments of a crack in the active fault in addition to the existence and the azimuth characteristic of the active fault based on the actually measured earthquake data, so that precursors of earthquakes can be monitored accurately.

The present invention makes it possible to accurately grasp precursors of earthquakes in accordance with the substance of the active fault through monitoring developments of a crack in the active fault in addition to the existence and the azimuth characteristic of the active fault based on the actually measured earthquake data. Therefore, the present invention can contribute to predicting occurrence of earthquakes in the countries having many earthquakes.

What is claimed is:

1. An earthquake precursor observing device for observing an earthquake precursor based on actually measured earthquake data, comprising:
   a data acquisition module which acquires earthquake data actually measured at a plurality of observation points;
   a pulse calculation module which acquires information of a propagation environment where seismic waves propagate from a hypocenter of an earthquake to each of the observation points, and applies time reversal processing on the seismic waves received at the plurality of observation points by considering the propagation environment to acquire time reversal pulses at each of the observation points;
   a line calculation module which calculates a parametric line in a length direction of a fault from a distribution of azimuths of frequency spectra of the time reversal pulses acquired by the pulse calculation module;
   a head searching module which searches a parametric head by analyzing the seismic waves received in the vicinity of the parametric line calculated by the line calculation module; and
   a monitoring module which monitors developments of a crack in the fault by observing the parametric head searched by the head searching module.

2. The earthquake precursor observing device as claimed in claim 1, wherein
   the head searching module analyzes a waveform of an earthquake for three velocity components in vertical and horizontal directions actually measured by a seismometer, the horizontal direction including two mutually orthogonal directions.

3. An earthquake precursor observing method for observing an earthquake precursor based on actually measured earthquake data, the method comprising:
   acquiring earthquake data actually measured at a plurality of observation points;
   acquiring time reversal pulses at each of the observation points by applying time reversal processing on seismic waves received at the plurality of observation points;
   acquiring information of a propagation environment where seismic waves propagate from a hypocenter of an earthquake to each of the observation points, and calculating a parametric line in a length direction of a fault from a distribution of azimuths of frequency spectra of the time reversal pulses acquired by considering the propagation environment;
   searching a parametric head by analyzing the seismic waves received in the vicinity of the calculated parametric line; and
   monitoring developments of a crack in the fault by observing the searched parametric head.

4. The earthquake precursor observing method as claimed in claim 3, comprising
   searching the parametric head by analyzing a waveform of an earthquake for three velocity components in vertical and horizontal directions actually measured by a seismometer, the horizontal direction including two mutually orthogonal directions.

* * * * *